(12) United States Patent
Akhtman

(10) Patent No.: US 7,409,009 B2
(45) Date of Patent: Aug. 5, 2008

(54) METHOD AND APPARATUS OF PEAK-TO-AVERAGE POWER RATIO REDUCTION

(75) Inventor: Yosef Akhtman, Southampton (GB)

(73) Assignee: Univeristy of Southampton, Southampton (GB)

( * ) Notice: Subject to any disclaimer, the term of this patent is extended or adjusted under 35 U.S.C. 154(b) by 657 days.

(21) Appl. No.: 10/822,887

(22) Filed: Apr. 13, 2004

(65) Prior Publication Data

US 2004/0218689 A1 Nov. 4, 2004

(30) Foreign Application Priority Data

Apr. 17, 2003 (GB) .................................. 0308985.1

(51) Int. Cl.
*H04L 25/03* (2006.01)
(52) U.S. Cl. ...................................................... 375/296
(58) Field of Classification Search ................ 375/295, 375/296, 261, 341, 346; 370/203, 210, 252
See application file for complete search history.

(56) References Cited

U.S. PATENT DOCUMENTS

| | | | | |
|---|---|---|---|---|
| 5,113,414 A * | 5/1992 | Karam et al. | ............... | 375/296 |
| 5,638,403 A | 6/1997 | Birchler et al. | | |
| 5,835,536 A | 11/1998 | May et al. | | |
| 5,930,299 A * | 7/1999 | Vannatta et al. | ............. | 375/269 |
| 5,991,262 A | 11/1999 | Laird et al. | | |
| 6,125,103 A | 9/2000 | Bauml et al. | | |
| 6,128,350 A | 10/2000 | Shastri et al. | | |
| 6,130,918 A | 10/2000 | Humphrey et al. | | |
| 6,175,551 B1 * | 1/2001 | Awater et al. | ............... | 370/210 |
| 6,240,141 B1 | 5/2001 | Long | | |

(Continued)

FOREIGN PATENT DOCUMENTS

EP    1058400    12/2000

(Continued)

OTHER PUBLICATIONS

Reducing The Peak-To-Average Power Ratio In OFDM Radio Transmission Systems; by Thomas May and Hermann Rohling; Institute of Telecommunications Technical University of Braunschweig, Germany, 0-7803-4320-4/98; 1998 IEEE; VTC'98; pp. 2474-2478.

(Continued)

*Primary Examiner*—David C. Payne
*Assistant Examiner*—Leon-Viet Q Nguyen
(74) *Attorney, Agent, or Firm*—O'Melveny & Myers LLP

(57) ABSTRACT

A technique of reducing the Peak-to-Average Power Ratio (PAPR) of Multi-Carrier (MC) modulated signals in which peaks in the baseband signal that lie above a threshold amplitude are detected and used to generate a pulse sequence signal which, after shaping, is subtracted from the baseband signal to reduce its PAPR. The method is spectrally efficient, has a low degree of implementation complexity and hence it is also suitable for low-power, portable implementation. Moreover, it is compatible with existing standard-based Orthogonal Frequency Division Multiplex (OFDM) systems. As an example of the performance of the proposed scheme, the amplifier back-off requirement in a Terrestrial Digital Video Broadcast (DVB-T) system can be reduced from 12 to 6 dB, while satisfying the of out-of-band emission specifications imposed by the Federal Communications Commission (FCC) spectral mask.

7 Claims, 8 Drawing Sheets

U.S. PATENT DOCUMENTS

| | | | |
|---|---|---|---|
| 6,314,146 | B1 | 11/2001 | Tellado et al. |
| 6,424,681 | B1 | 7/2002 | Tellado et al. |
| 6,445,747 | B1 | 9/2002 | Jafarkhani et al. |
| 6,504,862 | B1* | 1/2003 | Yang .................. 375/146 |
| 6,512,797 | B1 | 1/2003 | Tellado et al. |
| 6,529,925 | B1 | 3/2003 | Schenk |
| 2001/0000456 | A1* | 4/2001 | McGowan ............ 370/342 |
| 2001/0055320 | A1* | 12/2001 | Pierzga et al. .......... 370/480 |
| 2002/0136288 | A1* | 9/2002 | McCarty, Jr. .......... 375/232 |
| 2002/0159550 | A1* | 10/2002 | Jin ........................ 375/346 |
| 2002/0172146 | A1* | 11/2002 | Wu et al. ............... 370/208 |
| 2002/0176480 | A1 | 11/2002 | Wheatley, III et al. |
| 2002/0191705 | A1 | 12/2002 | Melsa et al. |
| 2002/0197970 | A1 | 12/2002 | Jian et al. |
| 2003/0043895 | A1 | 3/2003 | Melsa |
| 2003/0063683 | A1* | 4/2003 | MacFarlane et al. ...... 375/295 |
| 2004/0101062 | A1* | 5/2004 | Lindh .................... 375/261 |

FOREIGN PATENT DOCUMENTS

| | | |
|---|---|---|
| EP | 1195 962 A2 | 10/2002 |
| WO | WO 02/09373 A3 | 1/2002 |
| WO | WO2004/019540 A3 | 3/2004 |

OTHER PUBLICATIONS

Pulse Superposition: A Technique For Peak-To-Average Power Ratio Reduction In OFDM Modulation; by D. Farnese, A. Leva, G. Paltenghi and A. Spalvieri; Cefriel, via Fucini, Milano, Italy; Alcatel, Concorezzo, Milano, Italy, Politecnico di Milano, Milano, Italy, 0-7803-7400-2/02; 2002 IEEE; pp. 1682-1685.

"Reducing Out-Of-Band Emissions Due To Nonlinearities In OFDM Systems" by Mattias Lampe and Hermann Rohling, 0-7803-5565-2/99 1999 IEEE; Department of Telecommunications Technical University of Hamburg-Harburg, Eibendorfer Strabe 40, D-21073 Hamburg; pp. 2255-2259.

"Hardware Nonlinearities In Digital TV Broadcasting Using OFDM Modulation" by Ahmad Chini, Yiyan Wu, Mohammed El-Tanany and Samy Mahmoud, IEEE Transactions on Broadcasting; vol. 44, pp. 12-21, Mar. 1998.

"Impact Of Amplifier Nonlinearities On OFDM Transmission System Performance" by E. Costa, M. Midrio and S. Pupolin, IEEE Communications Letters; vol. 3; pp. 37-39; Feb. 1999.

"Peak-to-Mean Power Control In OFDM, Golay Complementary Sequences, And Reed-Muller Codes" by J. Davis and J. Jedwab, IEEE Transactions on Information Theory; vol. 45; pp. 2397-2417; Nov. 1999.

"M-Sequences For OFDM Peak-to-Average Power Ratio Reduction And Error Correction" by X. Li and J. A. Ritcey, Electronics Letters; vol. 33; pp. 554-555; Mar. 1997.

"Reduction of Peak Factor in Orthogonal Multicarrier Modulation by Amplitude Limiting and Coding" by D. Wulich and L. Goldfedl, IEEE Transactions on Communications; vol. 47; No. 1; pp. 18-21, 1999.

"Reducing the Peak-to-Average Power Ratio of OFDM" by R. van Nee and A. de Wild, IEEE VTC'98 Spring, (Ottawa, Canada); pp. 2072-2076; May 1998.

"OFDM with Reduced Peak-to-Mean Power Ratio by Optimum Combination of Partial Transmit Sequences" by S.H. Muller and J.B. Huber, Electronics Letters; vol. 33; pp. 368-369; Feb. 1997.

"Efficient Algorithm for Reducing PAR in Multicarrier Systems" by J. Tellado and J. Cioffi, ISIT 1998, (Cambridge, MA, USA); Aug. 1998.

47 CFR Ch.1 (Oct. 1, 1999 Edition), Federal Communications Commission; FCC Regulations; CFR Title 47, §§ 21.908.

"Nonrecursive Digital Filter Design Using $I_o$-Sinh Window Function" by J. Kaiser, In Proceedings IEEE Symposium on Circuits and Systems; pp. 20-23; Apr. 1974.

ETSI, Digital Video Broadcasting (DVB); Framing Structuer, Channel Coding and Modulation for Digital Terrestrial Television; ETSI; Aug. 1997; ETS 300 744; pp. 1-49.

"Effects of Clipping and Filtering on the Performance of OFDM" by X. Li and L. J. Cimini, Jr., IEEE VTC'97, (Phoenix, AZ, USA); pp. 1634-1638; IEEE, 4-7; May 1997.

* cited by examiner

METHOD AND APPARATUS OF PEAK-TO-AVERAGE POWER RATIO REDUCTION

BACKGROUND OF THE INVENTION

The invention relates to a method and apparatus for reducing peak-to-average power ratio in telecommunications systems.

Multi-Carrier (MC) modulation techniques [1] and in particular Orthogonal Frequency Division Multiplexing (OFDM) [1] constitute efficient modulation schemes, which are suitable for wireless broadband communications. In recent years several industrial standards based on OFDM have emerged, such as the Terrestrial Digital Video Broadcast (DVB-T), the IEEE 802.11 Wireless Local Area Network (W-LAN) scheme, as well as the IEEE 802.16 Broadband Wireless Access (BWA) standard. The more extensive employment of these systems is limited by their relatively high implementation cost, which is a consequence of requiring high-linearity, Class A amplifiers having a low power-efficiency. This requirement is imposed by the high Peak-to-Average Power Ratio (PAPR) of the OFDM signal, potentially resulting in non-linear distortions producing upper harmonics of the signal and associated out-of-band emissions [2,3]. The most problematic non-linear component within the transmission chain is the Power Amplifier (PA).

The most straightforward method of improving the linearity of the PA is to use an amplifier 'back-off', implying that the PA is configured to operate at a certain power, which provides a sufficiently high head-room for the high modulated signal peaks to be amplified without clipping. This allows the entire input signal to be amplified within the PA's linear range. Back-off results in inefficient operation of the PA. In some systems the power back-off requirements are as high as 12 dB. In terms of system costs, this translates into requiring a more than 10 times more powerful PA, which may be significantly more expensive. Therefore, the only attractive solution for improving the cost efficiency of MC systems is the reduction of the PAPR of the signal.

The PAPR properties of MC signals are now discussed. The non-linear distortion effects imposed by the PA manifest themselves as a reduction of the signal amplitude peaks according to the PA's Amplitude-to-Amplitude (AM/AM) conversion characteristic. A typical AM/AM transfer characteristic can be seen in FIG. 1. The intercept point in the figure indicates the so-called 1 dB compression point, where the output power level is 1 dB below the expected linear transfer function as a consequence of the compression of high output signal peaks.

The power of the distortion products produced by the PA is often defined as the amount of signal energy fed into the PA in excess of that corresponding to the 1 dB compression point. This quantity may be further characterized by the Peak-to-Average Power Ratio (PAPR) properties, i.e. by quantifying the statistical deviation of the input signal power peaks from the Root Mean Square (RMS) power. The signal's PAPR properties can also by characterized by the Threshold Crossing Probability (TCP), i.e. by the probability that the signal amplitude exceeds a certain threshold level. The TCP plot recorded for several single carrier modulation schemes and for a 1024-subcarrier OFDM scheme is depicted in FIG. 2.

In case of OFDM the transmitted baseband signal may be represented as:

$$s(t) = \sum_{k=0}^{K-1} (a_k + jb_k)\exp(-j2\pi\omega_k t), \quad (1)$$

where K is the number of subcarriers, while $a_k$ and $b_k$ are the real and imaginary components of the complex modulating symbols of the K subcarriers, respectively. For example, for 16-QAM modulation $a_k$ and $b_k$ may assume the equiprobable values of $\{-3, -1, 1, 3\}$. From the central limit theorem it follows [8] that for large values of K (in practice for K exceeding 64), both the real and imaginary component of s(t) become normally distributed variables having a mean of zero. Hence the amplitude of the complex baseband OFDM signal (for K>64) is complex Gaussian, or—synonymously—Rayleigh distributed. The distribution of the instantaneous power level hence becomes a central chi-square distribution with two degrees of freedom. In tangible physically interpreted terms the high PAPR is a consequence of the constructive superposition of high subcarrier values of numerous subcarriers.

Numerous studies have been published in recent years [1] which provide alternative solutions to the PAPR problem, for example [18, 14, 11, 19, 20, 21, 22, 23, 15, 16, 24, 9, 25, 26, 27, 28, 17, 29]. However, only a few of these have found their way into practical implementations. Some examples of previously proposed solutions, along with their associated limitations are as follows.

1. The introduction of a spectral guard band has the potential of preventing the spectral spillage of high-order non-linear distortion products into adjacent bands and hence mitigates the associated power back-off as well as linearity requirements. However, this approach is spectrally inefficient.

2. The employment of specific coding schemes reducing the PAPR [4,5,6] affects the design of the Forward Error Correction (FEC) coding scheme and hence may degrade the efficiency of the FEC code, as well as reduce the effective throughput, since they introduce redundancy by setting the parity bits of the associated block codes, such that they minimize the PAPR. Moreover, it is not a trivial task to find appropriate PAPR reduction codes for systems having a large number of subcarriers.

3. The set of distortionless techniques proposed in [12,13,14,15,16,17] may increase in importance for employment in future systems, although they exhibit a high complexity.

4. Clipping and filtering the modulated signal [7,8] as well as employing peak windowing [8,9,10,11] can be useful, but may introduce severe in-band distortions of the modulated signal, as now discussed.

The method introduced in [9] proposes to reduce the peak-to-average power ratio of the modulated signals such as OFDM or CDMA by canceling the large signal peaks with the aid of subtracting an appropriately designed reference function. Since the OFDM modulated signal is a composite multicarrier signal, while that of CDMA is a multichip signal, in [9] they were termed as composite-carrier signals. More specifically, the reference function is time shifted and scaled in such a way that after subtracting it from the original signal it reduces the peak power of at least one signal sample. In [9] it was proposed that the reference function should be selected such that its bandwidth was approximately or exactly the same as the bandwidth of the transmitted signal. This assures that the peak-to-average reduction procedure will not impose any out-of-band interference. An example of such a reference function was introduced in [9] which is a sinc function. It can be inferred therefore that the power of the peak cancellation signal is accommodated within the bandwidth of the information-carrying signal, hence causing significant in-band interference. Furthermore, in [9] the peak detection procedure is performed directly after the IFFT stage of the transmitter, resulting in poor peak-capture accuracy.

A technique somewhat similar to that of [9] is proposed in [11] for employment in CDMA-based systems. In [11] the PAPR reduction procedure is performed after oversampling the signal. Furthermore, an error signal is generated first by comparing the original oversampled signal with an amplitude threshold. The resultant error signal is then filtered by a shaping filter, reducing the associated out-of-band emission. Finally, the filtered error signal is subtracted from the original signal for the sake of producing a reduced-PAPR signal. Similarly to [9], the major disadvantage of the method advocated in [11] is that it imposes significant in-band distortion of the resultant signal.

The technique advocated in [17] utilizes one or more frequency tones of a Discrete Multi-Tone (DMT) signal for accommodating a PAPR reducing signal, where the modulating signal was chosen for minimizing the PAPR. In [17] it is proposed to choose the appropriate set of frequency tones for PAPR reduction based on the a posteriori information about the transmission link's frequency-domain transfer function. While this choice of the redundant sub-carriers is attractive, the technique assumes the explicit knowledge of the channel's transfer function at the transmitter, which is not readily available unless it is explicitly signaled by the receiver. Other disadvantages of the approach of [17] will be highlighted later in this section.

The method proposed in [17] was further developed in [15], where the reduction of the peak-to-average power ratio was also achieved by introducing a peak-reduction signal, conveyed by a certain subset of frequencies within the transmitted signal's information carrying bandwidth. An implementation example is provided where a reference function termed as a kernel signal is generated, which accommodates the peak-reduction signal by a specific subset of frequencies. First, similarly to [9] and [11], a time-domain peak detection procedure is invoked. Then the reference function is adjusted and subtracted from the original signal to negate at least one peak sample of the transmitted signal at a time. The PAPR reduction procedure of [15] can be performed iteratively for removing any new peak samples produced during the previous PAPR reduction operation. The appropriate subset of frequencies invoked for accommodating the redundant signal can be chosen randomly, pseudo-randomly or based upon various other criteria, such as the channel's transfer function. The techniques outlined in [15] and [17] have the disadvantage that they impose a certain spectral efficiency degradation, since part of the useful bandwidth is employed for conveying a PAPR reduction signal. Moreover, the methods of [15,17] require the transmission of additional side information about the frequency position of the subcarriers used for accommodating the redundant PAPR-reduction signal. Finally, the techniques of [15,17] are not amenable to employment in the context of the existing family of standardized multi-carrier communication systems, such as the 802.11, or DVB-T systems.

Crest factor reduction was also achieved by applying a correction vector to the transmitted data vector in [18]. The method of calculating the corresponding correction vector is briefly introduced in [18] in the context of OFDM and DMT. However, the method of [18] exhibits significant disadvantages. Specifically, a poor performance is achieved as a consequence of implementing it before oversampling. Furthermore, an in-band signal-to-noise ratio degradation is imposed by the correction vector. Finally, the method of [18] exhibits a high degree of implementation complexity as a result of its iterative nature.

SUMMARY OF THE INVENTION

The invention provides a frequency-domain guard band aided method of reducing the peak-to-average power ratio of a modulated baseband signal, where the baseband signal is constituted by a waveform function, such as OFDM or MC-CDMA, modulated by information-carrying symbols transmitted in parallel.

The method can be assisted by the generation of a pulse sequence formed by detecting the original signal's power envelope peaks that exceed a threshold.

Peak detection can be performed after the signal is oversampled. This ensures accurate detection of the power envelope peaks.

The method can include filtering of the pulse sequence indicating the positions of the high envelope peaks, which is carried out by the pulse sequence shaping filter, resulting in a peak-cancellation signal.

The shaping filter can be designed such that its pass-band is limited to the frequency-domain gap between the edge of the information-carrying frequency bandwidth of the signal and the edge of the channel's frequency band defined by the spectral mask specifying the maximum tolerable out-of-band emission.

The filtered peak-cancellation signal is advantageously subtracted from the original signal for the sake of producing a desired signal having reduced PAPR.

The method can be applied to digital video broadcasting as well as OFDM for mobile communications, for example VSF/OFCDM which may use 100 Mb/s air interface technology.

The invention also provides a transmitter comprising:

a baseband signal generator for generating a digital baseband signal ($š[n]$) from an input data stream;

a digital-to-analogue converter for converting the digital baseband signal into an analogue baseband signal ($s[t]$) prior to output by a transmitter stage [TX];

an oversampling filter arranged between the baseband signal generator and digital-to-analogue converter for oversampling the digital baseband signal and thus generating an oversampled digital baseband signal ($ŝ[m]$);

a signal divider for splitting the oversampled digital baseband signal into first and second parts;

a peak detector arranged to receive the first part of the oversampled digital baseband signal as input and configured to output a pulse sequence signal ($p[m]$) containing a pulse for each peak in the oversampled digital baseband signal that exceeds a threshold level (C);

a pulse shaping filter for receiving the pulse sequence signal and converting it into a filtered clipping signal ($c[m]$); and a signal combiner for subtracting the filtered clipping signal from the second part of the oversampled digital baseband signal so as to produce a digital baseband signal ($ŝ'[m]$) with reduced PAPR which is routed to input into the digital-to-analogue converter for transmission by the transmitter (TX).

It will be understood that the term transmitter should be construed to include relay stations or repeaters that server to re-transmit signals, as well as to the original transmitters.

The pulses of the pulse sequence signal preferably have a magnitude corresponding to the amount by which the peak concerned exceeds the threshold level (C). In an embodiment of the invention, the pulse shaping filter is a FIR filter.

The invention is free from the in-band interference limitations of [9], since the SNR degradation imposed within the information-carrying signal's bandwidth is insignificant and controllable. This follows from the use of a FIR filter for shaping the peak cancellation signal, rather then shifting and scaling the reference function as in [9]. Furthermore, in the invention, a peak cancellation procedure is performed after oversampling in the transmitter to provide accurate peak capture. This is preferable to [9] in which peak detection is performed directly after the IFFT stage of the transmitter, i.e. without oversampling, which results in peak capture accuracy that is too poor for some types of systems.

The invention has the following virtues:
a) The peak cancellation signal introduces no significant spectral efficiency reduction.
b) The peak cancellation signal introduces a low and controllable amount of SNR degradation within the information-carrying frequency bandwidth.
c) The method is compatible with the family of existing standardized OFDM-based communication systems such as DVB-T and IEEE 802.11 Wireless Local Area Network (W-LAN) scheme.
d) The method is independent of the particular structure of the information-carrying signal, thus it can be employed in conjunction with virtually any modulation scheme exhibiting a high peak-to-average power ratio, such as for example OFDM, CDMA or MC-CDMA.
e) The method has a low computational complexity employing a peak detector and an FIR filter, dispensing with iterative optimization.
f) The method can be implemented by upgrading the transmitter without modifying receivers, which is a major advantage for wireless telephony applications.
g) The method avoids using carriers that lie in-band as advocated in some prior art proposals.

BRIEF DESCRIPTION OF THE DRAWINGS

For a better understanding of the invention and to show how the same may be carried into effect reference is now made by way of example to the accompanying drawings.

DETAILED DESCRIPTION

The impact of the amplifier-induced non-linear distortions manifests itself as:
1. in-band waveform distortion, resulting in a Signal-to-Noise Ratio (SNR) degradation, and
2. out-of-band emission of high-order non-linear distortion products resulting in adjacent channel interference.

The relative importance of these effects varies in the context of different applications according to the particular SNR and out-of-band emission requirements of the system considered. However, in most practical cases the out-of-band emission is the limiting factor, which defines the amplifier back-off requirements.

The square-root Nyquist-shaped transmit filter of multi-carrier systems, such as OFDM, typically exhibits a low Nyquist roll-off factor. In the transition-band of the transmit filter typically virtual subcarriers are allocated, which carry no useful information. Additionally, often a certain frequency domain guard band is used for eliminating the potential adjacent-channel interference, hence the transmit and receive filtering does not distort the frequency domain modulated signal.

The proposed PAPR reduction technique of the invention employs this frequency domain guard band for accommodating the spectrum of an appropriately designed clipping signal, which assists in reducing the PAPR of the OFDM signal. This clipping signal is designed such that the in-band distortion imposed by the clipping procedure is minimized. The idea of using a fraction of the useful data-bearing subcarriers for carrying a signal which reduces the PAPR was previously introduced in [13]. The philosophy of employing these redundant PAPR-reduction subcarriers may be interpreted as comparable to using the previously mentioned block-coding scheme, which incorporates redundant bits in the time domain. However, the solution advocated in [13] was computationally demanding, and it was unsuited for employment in numerous standardized OFDM systems, such as DVB-T. Our proposed method adopts a different approach, as it will be outlined below.

Figure 1:
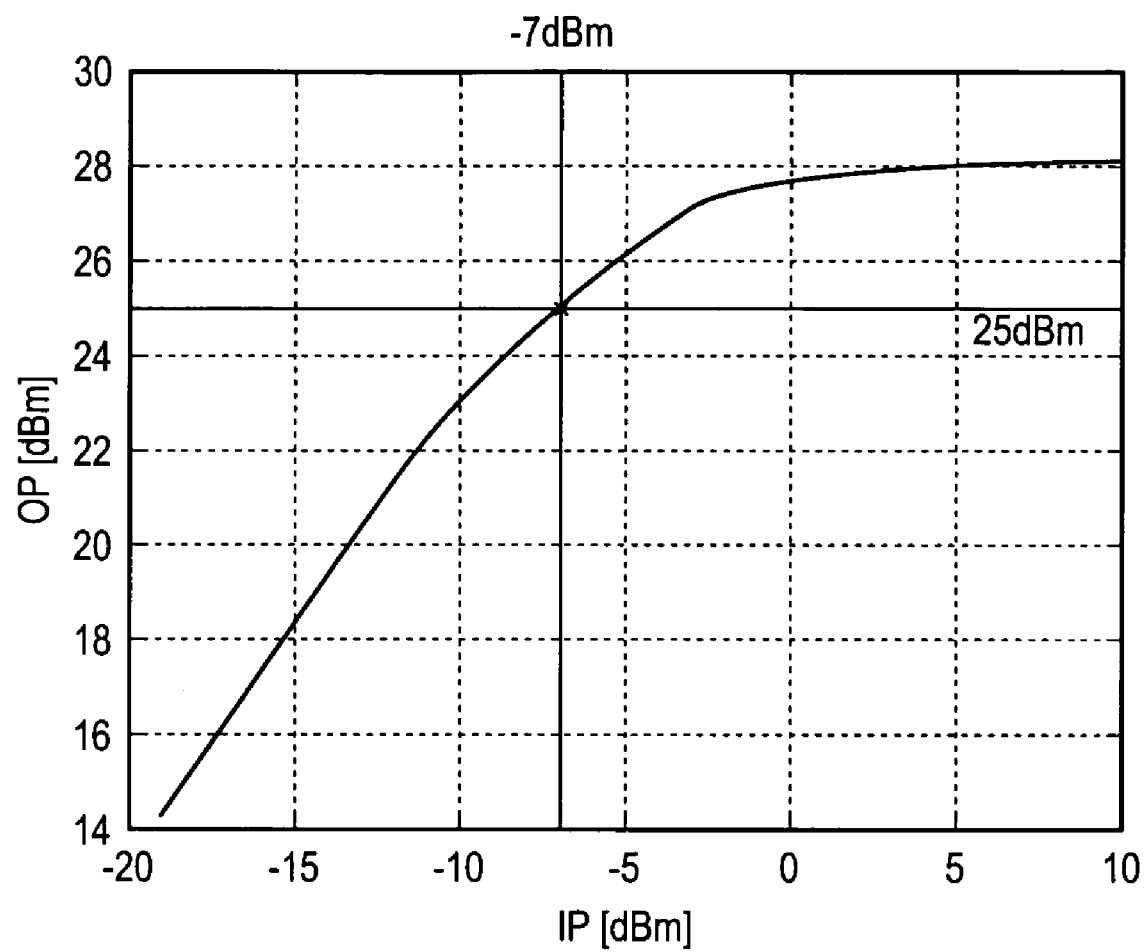
FIG. 1: Typical amplifier output power (OP) versus input power (IP) response.
Figure 2:
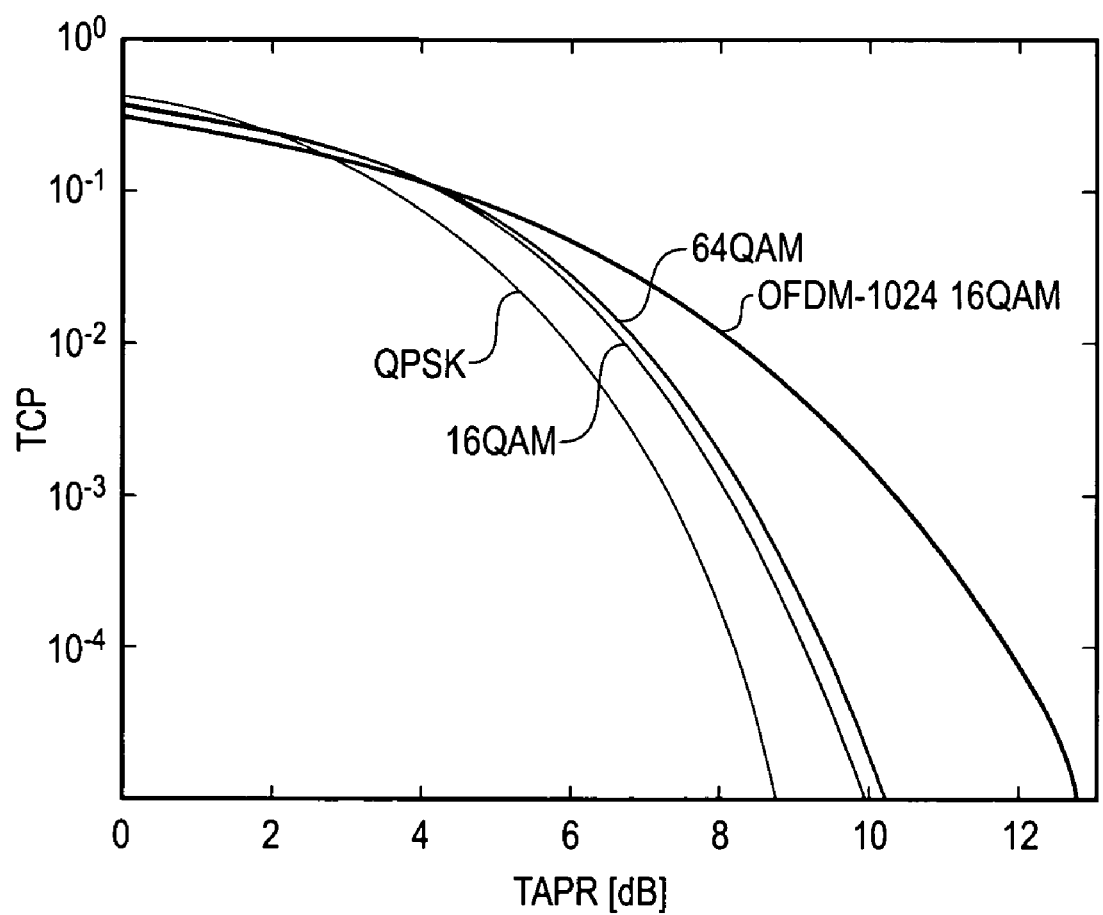
FIG. 2: Signal power Threshold Crossing Probability (TCP) versus the Threshold-to-Average Power Ratio (TAPR) for 4, 16 and 64 QAM single carrier modulation schemes and for 1024-subcarrier OFDM. The RMS value of all the signals was normalized to unity.
Figure 3:
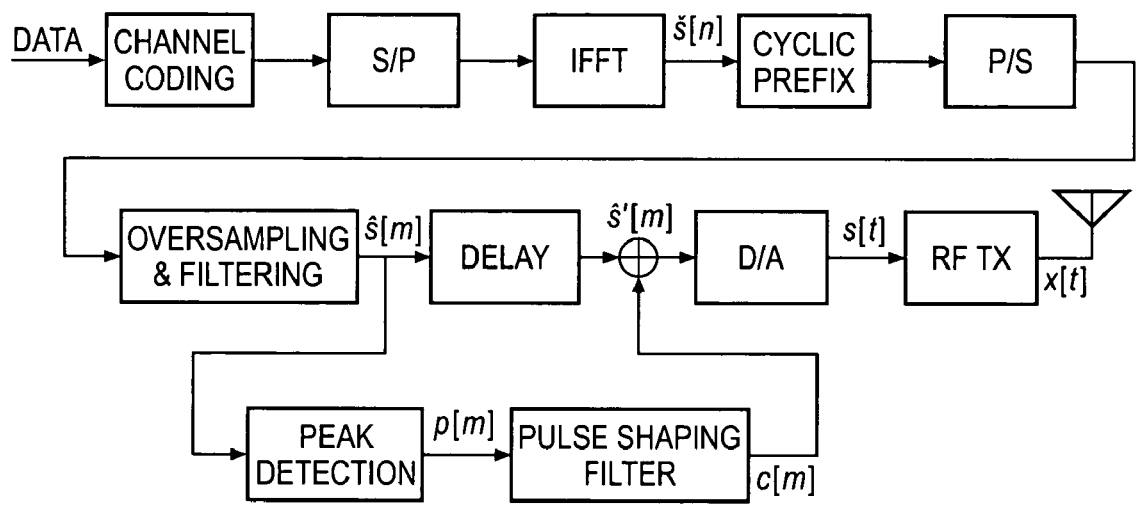
FIG. 3: Detailed OFDM transmitter according to an embodiment of the invention showing the PAPR reduction blocks

Let us consider a generic channel coded OFDM system, including the proposed PAPR reduction block, as depicted in FIG. 3. The IFFT block of FIG. 3 produces the complex discrete baseband signal of $$\check{s}(n) = \sum_{k=0}^{K-1} (a_k + jb_k)\exp j2\pi \frac{kn}{K}, \qquad (2)$$

where, again, K is the number of subcarriers, while $a_k$ and $b_k$ are the real and imaginary components of the complex modulating symbols, respectively. After appending the cyclic prefix this signal is then parallel-to-serial (P/S) converted, oversampled by a factor of I, namely by inserting (I−1) zero samples after each signal sample and filtered by an interpolation filter, in order to produce the discrete complex valued signal of $$\hat{s}[m] = \sum_{l=0}^{L-1} f[l]\check{s}\left[((m-l)_{div\ I} + P)_{mod\ K}\right] \cdot \delta[(m-l)_{mod\ I}], \qquad (3)$$

where m is the sample index, f[l] is the $l^{th}$ tap of an $(L+1)^{th}$ order interpolation filter, P is the cyclic prefix duration expressed in terms of the number of samples before oversampling, while δ[ ] is the Kronecker delta function. The signal $\hat{s}[m]$ is then fed into the Digital to Analogue Converter (D/A) of FIG. 3 for generating the analogue baseband signal s(t). The in-phase and quadrature-phase signals are used for conveying the real and imaginary components of the complex baseband signal. The analogue baseband signal s(t) is first up-converted to the intermediate frequency, producing a real-valued analogue pass-band signal. Finally, the resultant signal is fed into the Radio Frequency (RF) transmitter (TX), where it is up-converted to the desired RF carrier frequency and amplified.

The resultant real signal x(t) at the input of the PA may be represented as:

$$x(t) = \Re\{s(t)\exp(j2\pi f_c t)\}, \qquad (4)$$

where $\Re\{\ \}$ represents the "real part of { }", $f_c$ is the frequency of the carrier and s(t) represents the complex envelope of the modulated signal x(t).

The crest-factor reduction algorithm is now described. The proposed algorithm detects and removes high instantaneous signal power peaks, before the signal is fed into the RF transmission chain. More explicitly, we endeavored to remove the power peaks exceeding a certain power threshold of $C^2$, by clipping the modulated signal envelope peaks satisfying the condition $$x^2(t) > C^2. \qquad (5)$$

Since in Eq. 4 we have exp $(j2\pi f_c t) \leq 1$, it may be inferred that for $x^2(t) > C^2$ we have $|s(t)| > C$. Therefore the appropriate point to include the peak detection and clipping arrangement within the transmitter schematics of FIG. 3 would be at the output of the oversampling and interpolation filtering stage, producing the signal $\hat{s}[m]$.

Figure 4:
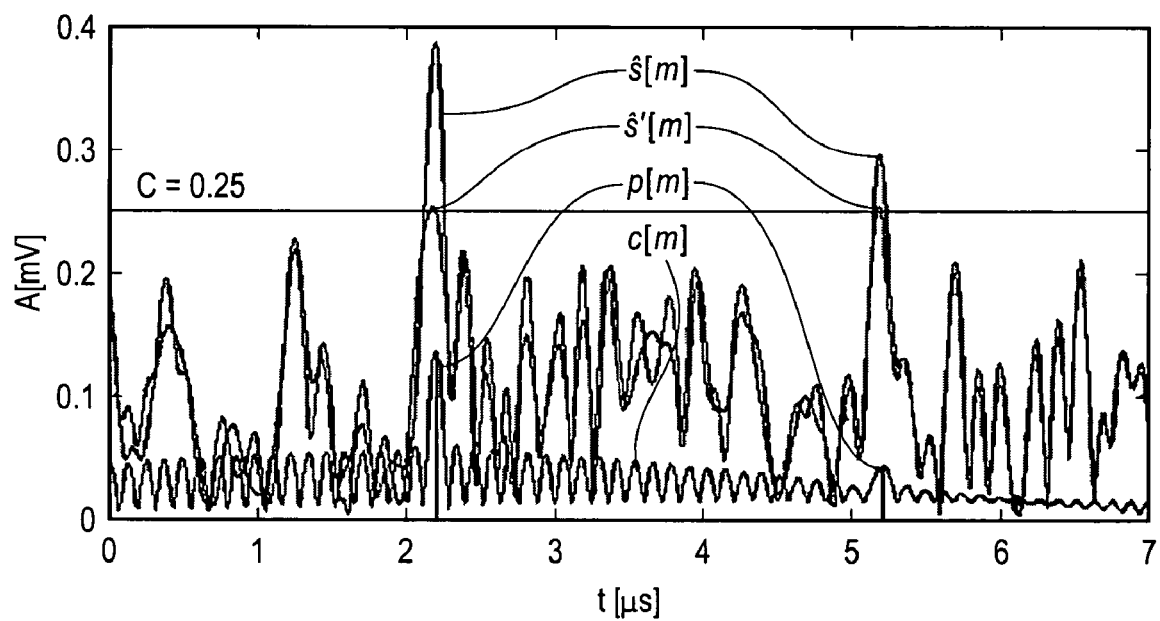
FIG. 4: Snapshots of amplitude (A) versus time (t) of the original OFDM signal $\hat{s}[m]$, the pulse sequence $p[m]$, the filtered clipping signal $c[m]$, and the resultant OFDM signal $\hat{s}'[m]$, generated after the PAPR reduction stage of FIG. 3. The clipping threshold level of C=0.25 is also shown.

First the high peaks have to be detected. The goal of this task is to analyze the baseband OFDM signal and to identify the amplitude peaks exceeding the voltage threshold level C. This produces an oversampled signal sample sequence constituted by the signal peaks exceeding C in the following form:

$$p[m] = \sum_i (\hat{s}[m] - C)\delta[m - m_i], \qquad (6)$$

where i is the non-uniformly spaced sample index running over the specific set of samples, which exceed the threshold C. These non-uniformly spaced index values $m_i$ are defined by $$\hat{s}[m_i] = \max_{m_i' \leq m \leq m_i''} \{\hat{s}[m]\}, \qquad (7)$$

where $s[m_i']$ represents a sample on the rising edge of the signal, where it first exceeds the threshold C, while $s[m_i'']$ is a sample, where the signal peak dips below the threshold C following an excursion above it. The resultant pulse sequence p[m] is depicted in FIG. 4 with the aid of the black bars at positions of approximately 2.2 μs and 5.2 μs, respectively.

The pulse sequence p[m] is then processed by a shaping filter. The design of an appropriate shaping filter will be discussed below. In case of an $L^{th}$ order Finite Impulse Response (FIR) filter having an impulse response f[l], the filtered clipping signal c[m] can be expressed as the convolution of f[l] and p[m], yielding:

$$c[m] = \sum_{l=0}^{L-1} f[l]p[m-l]. \qquad (8)$$

Finally, the filtered clipping signal c[m] is synchronized with and subtracted from the discrete original OFDM signal $\hat{s}[m]$, in order to produce the desired signal having a reduced PAPR as follows:

$$\hat{s}'[m] = \hat{s}[m-v] - c[m], \qquad (9)$$

where v is an integer delay introduced for ensuring the appropriate time alignment of the signals. The required value of v depends on the delay of the particular shaping filter design used and on the peak detection scheme's structure. The detailed structure of the resultant OFDM transmitter is depicted in FIG. 3. Snapshots of the original modulated signal $\hat{s}[m]$ of Eq. 3, the detected pulse sequence p[m], that of the filtered clipping signal c[m] shown in Eq. 8, as well as the resultant OFDM signal $\hat{s}'[m]$ obeying Eq. 9 can be seen in FIG. 4.

Figure 5:
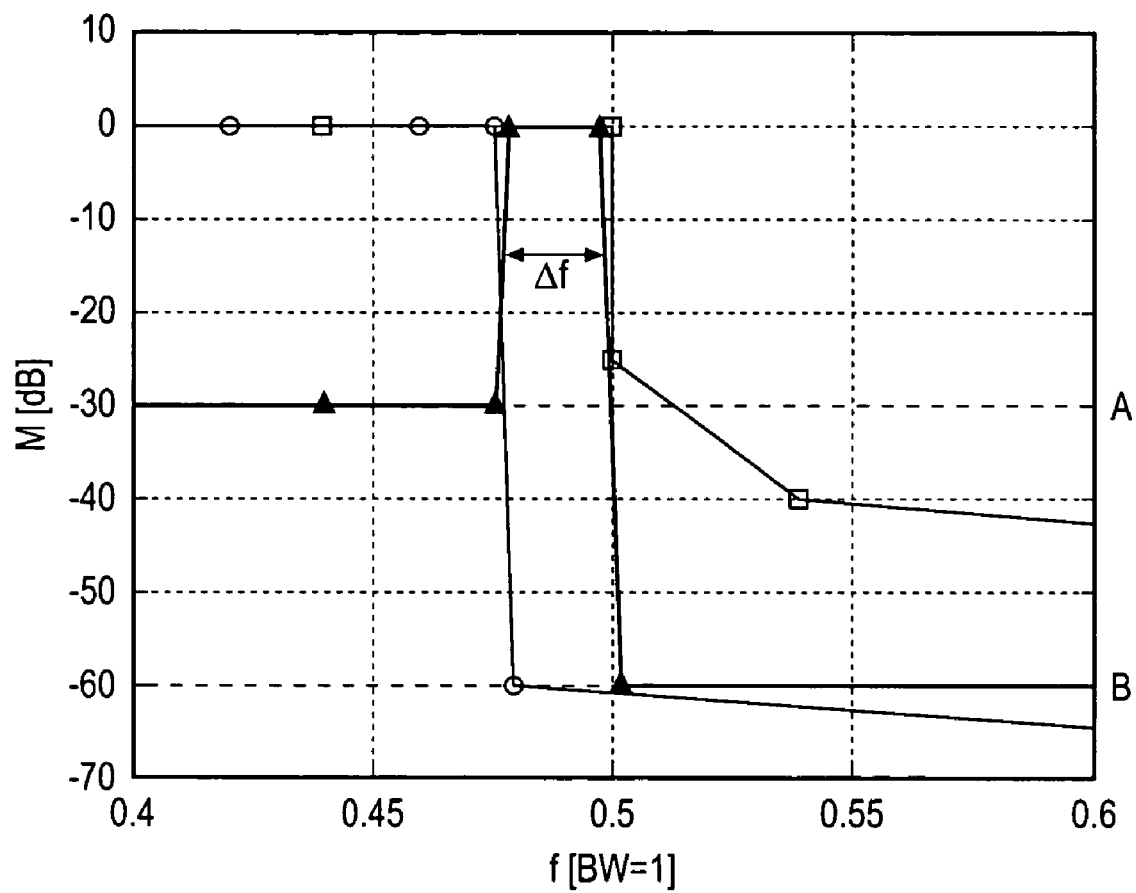
FIG. 5: Stylized spectral masks specifying the pulse sequence shaping filter as magnitude (M) versus normalized frequency (f). The choice of the particular parameters A and B is representative of the DVB-T system. The characteristics of the desired pulse-sequence shaping filter mask (filter mask labeled with triangles) are defined by the out-of-band emission requirements imposed by the FCC (FCC mask labeled with squares), and by the DVB-T signal's power spectral density function (OFDM signal labeled with circles). The bold line represents the shaping filter's transfer function requirements. It can be seen that most of the clipping signal's power is concentrated in the frequency-domain gap between the edge of the OFDM signal's spectrum and the spectral mask edge. This is necessary for ensuring that the clipping signal will introduce low in-band distortion, defined by the attenuation level A, as well as, virtually no out-of-band emission, defined by the attenuation level B.

The shaping filter design is now described. The salient feature of the proposed method is the choice of the pulse-sequence shaping filter. This filter is used for shaping the discrete pulse sequence generated by the detection of the peaks of the baseband OFDM signal, which exceed the amplitude threshold C. The characteristics of the desired filter's spectral mask are defined by the out-of-band emission requirements expressed in terms of the spectral mask imposed by the Federal Commission of Communications (FCC) [30] on a particular OFDM signal's power spectral density function. The corresponding spectral masks are represented in FIG. 5. Observe in FIG. 5 that the OFDM signal's spectral mask was designed such that it does not fully occupy the entire pass-band of the FCC's spectral mask, leaving a guard-band of width Δf between the masks indicated by the squares and circles. The bold lines indicate the desirable spectral characteristics of the clipping signal, which again is expected to have a low Power Spectral Density (PSD) within the useful signal's band for the sake of minimizing the in-band distortion of the useful signal's spectrum. The majority of the clipping signal's PSD is expected to fall within the guard band. More explicitly, by appropriately designing the clipping signal will introduce only a low in-band distortion, which is below the attenuation level A, while inflicting virtually no out-of-band emission, which must be below the attenuation level B. Thus, the spectral-domain Transfer Function (TF) of an appropriate filter is expected to comply with the spectral requirements summarized in Table 1. Below we will consider an appropriate FIR shaping filter design.

TABLE 1

Pulse sequence shaping filter requirements

1. Exhibit an attenuation of A dB within the baseband OFDM signal's transmission band, where A is a configurable system parameter, which defines the amount of in-band distortion introduced by the peak clipping process. The role of the parameter A becomes explicit in the spectral mask of FIG. 5.
2. Exhibit a pass-band width of Δf having an attenuation of 0 dB at the edge of the baseband OFDM signal's transmission band.
3. Impose a stop-band attenuation of at least B dB.

The FIR pulse sequence shaping filter design is now described. We will commence by stipulating a frequency-domain transfer function for the pulse shaping filter, which is defined only at discrete frequencies as follows:

$$G[k] = \begin{cases} A & k < k', k > k'' \\ 0 & k = k', k = k'' \\ B & k' < k < k'' \end{cases} \quad (10)$$

where $k \in [0, I(K+P)-1]$ is a frequency domain index, representing the $I(K+P)$ number of discrete frequency-domain tones in the range $$\left[-\frac{F_s}{2}, \frac{F_s}{2}\right],$$

where $F_s$ is the sampling frequency used after introducing oversampling for the sake of more accurate peak-capture. Clearly, G[k] complies with the requirements of Table 1, when using an appropriate choice of the values k' and k''. Furthermore, the discrete-frequency pulse-shaping filter transfer function G[k] has a single-sample pass-band. The impulse response corresponding to this transfer function can be obtained by inverse Fourier transforming G[k] and is given by:

$$g[l] = \frac{1}{(K+P)I} \sum_{k=0}^{(K+P)I-1} G[k] \exp j2\pi \frac{kl}{(K+P)I}, \quad (11)$$

where again, K is the number of subcarriers, P is the number of samples in the cyclic prefix and I is the previously introduced oversampling factor.

The discrete-frequency transfer function G[k] is infinitely steep, having an infinite-duration impulse response g[l]. In order to minimize the complexity of the filtering procedure, we intend to keep the filter's order to a minimum. However, it is also desirable to mitigate the effects of the frequency-domain Gibbs oscillation imposed by using a low-order FIR filter. In order to strike a trade-off, we multiplied the FIR filter's impulse response by a time-domain windowing function, yielding:

$$f[l] = g[l] \cdot w[l], \quad (12)$$

where f[l] is the desired FIR filter's impulse response and w[l] is the time-domain windowing function. In the frequency-domain the resultant FIR filter transfer function can be expressed as a convolution of G[k] with the frequency response W[k] of the windowing function, yielding:

$$F[k] = \sum_{m=0}^{M-1} G[k-m] W[k]. \quad (13)$$

Let us now focus our attention on the choice of the windowing function. Since according to Eq. 10 G[k] has a single-sample pass-band, the bandwidth of the resultant FIR filter's pass-band will be equal to the bandwidth of the windowing function's spectral-domain main lobe. Therefore, the requirements detailed in Table 1 apply to the bandwidth of the windowing function's spectral-domain main lobe. Furthermore, as defined in Table 1, the stop-band attenuation of the filter should be at least B dB, which imposes an additional restriction on the windowing function's spectral side-lobe attenuation. Thus, the frequency response of the desired windowing function should comply with the following requirements:

1. Have a main-lobe bandwidth of less than Δf.
2. Exhibit a side-lobe attenuation of at least B dB.

A specific windowing function, which was found to be the most suited one for our system is the Kaiser windowing function [31] given by:

$$w[l] = \frac{I_0\left(2\alpha \frac{l(L-l)}{L}\right)}{I_0(\alpha)}, \quad (14)$$

where $I_0$ is a zero-order modified Bessel function [32] and L is the time-domain window duration expressed in samples. The parameter α is specified by the required frequency domain side-lobe attenuation, i.e. by the filter design parameter B of FIG. 5. Since the windowing function and the parameter α have been appropriately selected, the minimum window duration L and the associated minimum shaping FIR filter order are defined by the required bandwidth Δf of the main-lobe of the windowing function's frequency response.

Figure 6:
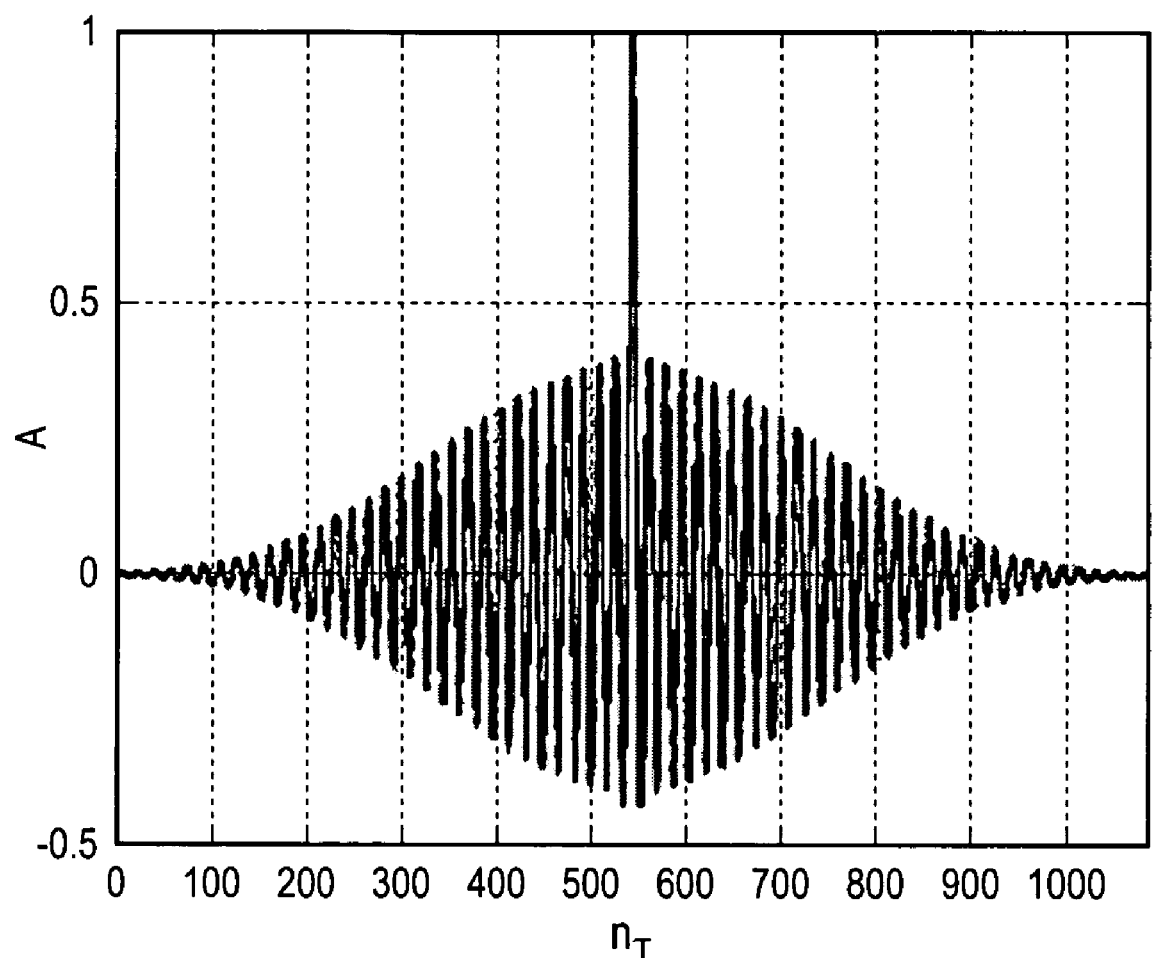
FIG. 6: FIR pulse-sequence shaping filter impulse response using Kaiser windowing and $\alpha$=8 in terms of amplitude (A) versus tap number ($n_T$).
Figure 7:
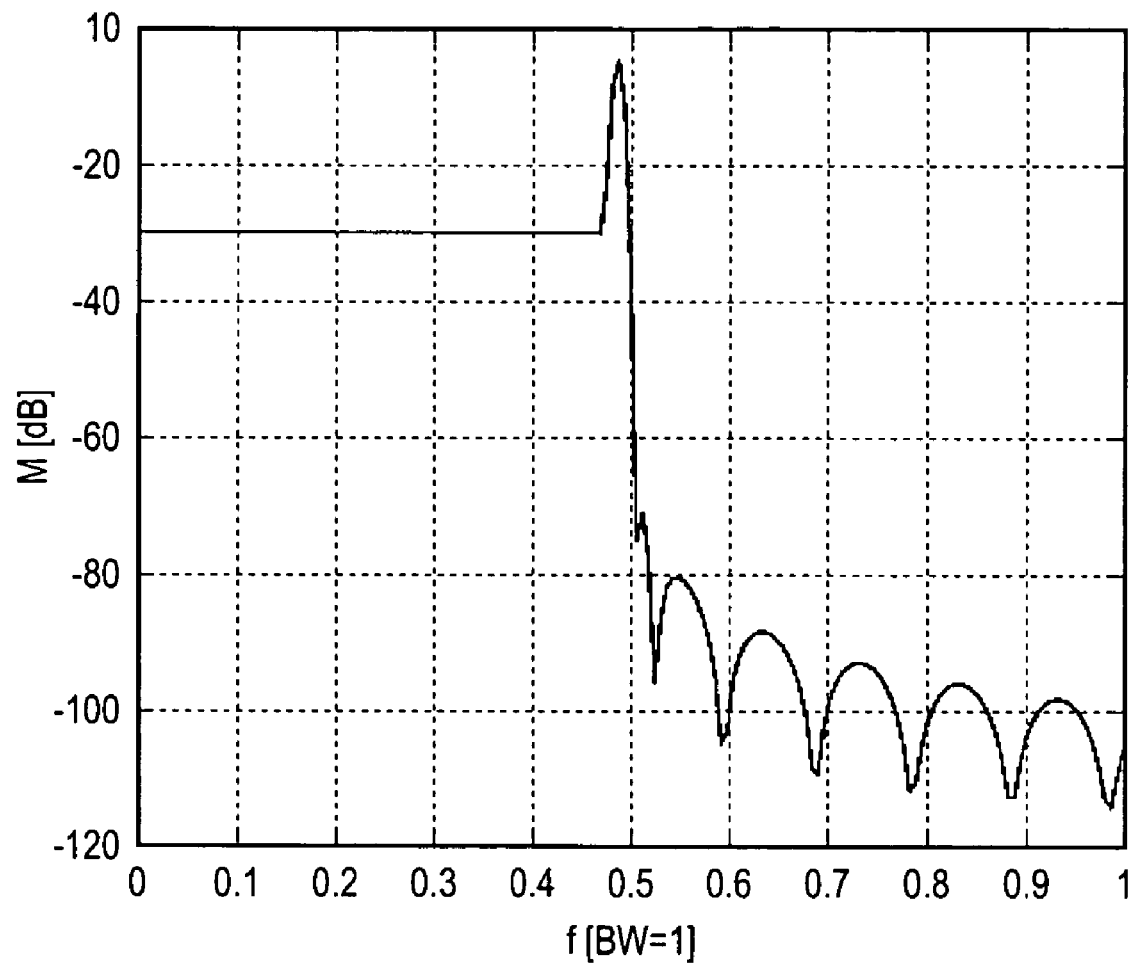
FIG. 7: FIR pulse-sequence shaping filter transfer function using Kaiser windowing and $\alpha$=8 plotted as magnitude (M) versus normalized frequency (f).

For the specific example of the DVB-T system described below, the resultant filter's Kaiser-windowed impulse response can be seen in FIG. 6, while the corresponding frequency-domain transfer function is represented in FIG. 7. The Kaiser window used in this particular case invoked α=8.

APPLICATION EXAMPLE

Let us now consider a practical application of the proposed PAPR reduction technique in the context of the Pan-European terrestrial video broadcast system known as DVB-T [33]. The corresponding system parameters are summarized in Table 2.

Table 2: DVB-T system parameters [33].

| Mode | 2 K |
| --- | --- |
| Channel bandwidth | 6 MHz |
| Number of carriers K | 1705 |
| OFDM symbol duration $T_U$ | 298.667 μS |
| Carrier spacing $1/T_U$ | 3.3482 kHz |
| Effective bandwidth $(K - 1)/T_U$ | 5.71 MHz |

The out-of-band emission requirements for this application are imposed by the Federal Communications Commission (FCC) defined [30] spectral mask, which can be seen in FIG. 5. (The original out-of-band emission specifications for DVB-T are defined by the ETSI [33], however we used the closely-related FCC spectral mask [30], which is somewhat more stringent.)

Figure 8:
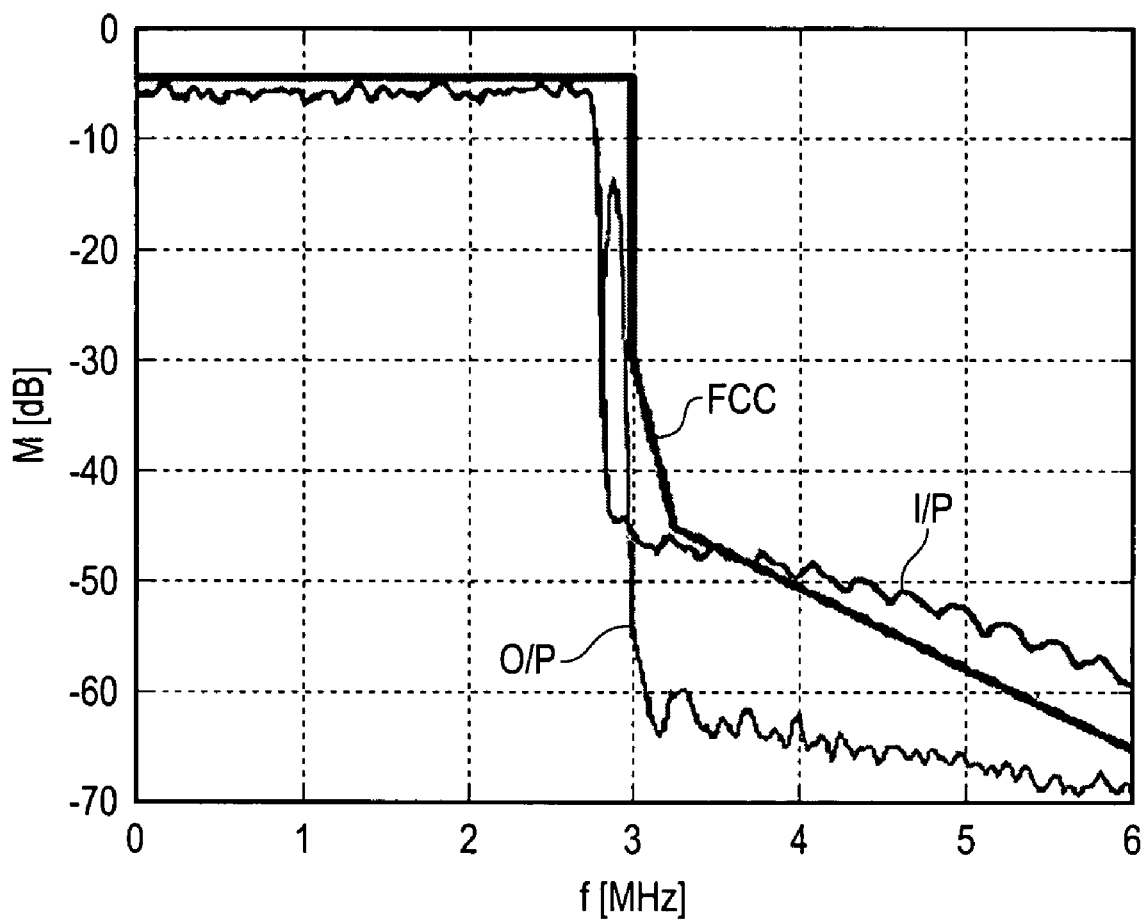
FIG. 8: Power Spectral Density (PSD) functions plotted as magnitude (M) versus frequency (f) of both the original 2K mode, 6 MHz bandwidth, DVB-T signal transmitted using a 23 dB gain RF power amplifier having a 6 dB power back-off (labeled I/P), as well as that of the same signal processed by the proposed PAPR reduction algorithm (labeled O/P). The spectral mask defined by FCC, imposing the out-of-band emission requirements for the DVB-T transmission is also shown (labeled FCC).

A standard RF PA back-off of 12 dB was defined by the DVB-T specifications, which allows the transmission of the DVB-T OFDM signal without violation of the FCC spectral mask. On the other hand, transmission with a power back-off below 12 dB results in violating the FCC requirements. For example the spectrum of the DVB-T signal transmitted at a 6 dB power back-off can be seen in FIG. 8. However, if the proposed PAPR reduction scheme is employed, transmission at 6 dB back-off can be carried out without any FCC spectral mask violation, as evidenced by FIG. 8. As expected, the waveform shape of the original OFDM signal was slightly distorted, when subtracting the filtered clipping signal (see FIG. 4), inflicting a moderate spectral regrowth, which can be observed in FIG. 8. However, most of the spectrum of the clipping signal was concentrated within the spectral gap between the edge of the information carrying subcarriers and the FCC spectral mask of FIG. 5.

As previously stated, a certain fraction of the clipping signal's power falls within the information carrying OFDM signal's bandwidth. However, the associated Signal-to-Noise Ratio (SNR) is controlled by the parameter A defined in Eq. 10 and FIG. 5. In this particular case A was set to 30 dB, which implies that a minimum SNR of 30 dB was maintained. Thus, the clipping-induced degradation of the Bit Error Rate (BER) performance may be considered insignificant. For example, when an Additive White Gaussian Noise (AWGN) source having an SNR level of 40 dB was employed, the SNR detected at the receiver was found to be 32 dB.

In summary, the pulse-sequence shaping filter employed in this particular application was designed following the approach represented above. The resultant filter's impulse response was shown in FIG. 6, while the corresponding frequency-domain transfer function was depicted in FIG. 7. We have demonstrated that the proposed method is appealing both in terms of its PAPR-reduction performance and its simplicity of implementation.

REFERENCES

[1] L. Hanzo, M. Münster, B. Choi, and T. Keller, OFDM and MC-CDMA. John Wiley—IEEE Press, May 2003.

[2] A. Chini, Y. Wu, M. El-Tanany, and S. Mahmoud, "Hardware nonlinearities in digital TV broadcasting using OFDM modulation," *IEEE Transactions on Broadcasting*, vol. 44, pp. 12-21, March 1998.

[3] E. Costa, M. Midrio, and S. Pupolin, "Impact of amplifier nonlinearities on OFDM transmission system performance," *IEEE Communications Letters*, vol. 3, pp. 37-39, February 1999.

[4] J. Davis and J. Jedwab, "Peak-to-mean power control in OFDM, Golay complementary sequences, and reed-muller codes," *IEEE Transactions on Information Theory*, vol. 45, pp. 2397-2417, November 1999.

[5] X. Li and J. A. Ritcey, "M-sequences for OFDM peak-to-average power ratio reduction and error correction," *Electronics Letters*, vol. 33, pp. 554-555, March 1997.

[6] D. Wulich and L. Goldfeld, "Reduction of peak factor in orthogonal multicarrier modulation by amplitude limiting and coding," *IEEE Transactions on Communications*, vol. 47, no. 1, pp. 18-21, 1999.

[7] X. Li and L. Cimini, "Effects of clipping and filtering on the performance of OFDM," in *Proceedings of IEEE VTC'97*, (Phoenix, Ariz., USA), pp. 1634-1638, IEEE, 4-7 May 1997.

[8] R. van Nee and A. de Wild, "Reducing the peak-to-average power ratio of OFDM," in *IEEE VTC'98 Spring*, (Ottawa, Canada), pp. 2072-2076, May 1998

[9] G. Awater, R. van Nee, and A. de Wild, "Transmission system and method employing peak cancellation to reduce the peak-to-average power ratio." U.S. Pat. No. 6,175,551, 16 Jan. 2001.

[10] R. van Nee and R. Prasad, *OFDM for wireless multimedia communications*. London, UK: Artech House Publishers, 2000.

[11] H.-K. Yang, "Method and apparatus for reducing the ratio of peak to average power in Gaussian signal including a CDMA signal." U.S. Pat. No. 6,504,862, 7 Jan. 2003.

[12] S. H. Müller and J. B. Huber, "OFDM with reduced peak-to-mean power ratio by optimum combination of partial transmit sequences," *Electronics Letters*, vol. 33, pp. 368-369, February 1997.

[13] J. Tellado and J. Cioffi, "Efficient algorithm for reducing PAR in multicarrier systems," in *ISIT* 1998, (Cambridge, Mass., USA), August 1998.

[14] J. Tellado and J. Cioffi, "Peak to average power ratio reduction." U.S. Pat. No. 6,512,797, 28 Jan. 2003.

[15] J. Tellado and J. Cioffi, "Peak to average power ratio reduction." U.S. Pat. No. 6,424,681, 23 Jul. 2002.

[16] J. Tellado and J. Cioffi, "Peak to average power ratio reduction." U.S. Pat. No. 6,314,146, 6 Nov. 2001.

[17] M. May, T. Johnson, and M. Pendleton, "Method and apparatus for reducing peak-to-average requirements in multi-tone communication circuits." U.S. Pat. No. 5,835,536, 10 Nov. 1998.

[18] H. Schenk, "Method for reducing the crest factor of a signal." U.S. Pat. No. 6,529,925, 4 Mar. 2003.

[19] M. Lennart and J. Heng-Yu, "Reducing the peak-to-average power ratio of a communication signals." Patent Application Publication, Pub. No. US2002197970, Pub. Date: 26 Dec. 2002.

[20] T. Zogakis and P. Melsa, "Method and apparatus for peak prediction enabling peak-to-average ratio (par) reduction." Patent Application Publication, Pub. No. US2002191705, Pub. Date: 19 Dec. 2002.

[21] Y. Hong-Kui, "Method & and apparatus for reducing the peak power probability of a spread spectrum signal." European Patent No. EP1058400, 6 Dec. 2002.

[22] R. Attar and C. Wheatley, "Method and apparatus for peak-to-average power reduction." Patent Application Publication, Pub. No. US2002176480, Pub. Date: 28 Nov. 2002.

[23] H. Jafarkhani and V. Tarokh, "Method and apparatus to reduce peak to average ratio in multi-carrier modulation." U.S. Pat. No. 6,445,747, 3 Sep. 2002.

[24] G. Long, "Low complexity peak-to-average reduction using intermediate-result subset sign-inversion for dsl." U.S. Pat. No. 6,240,141, 29 May 2001.

[25] L. Humphrey and A. Wallace, "Method and apparatus for reducing the peak-to-average ratio in multi-carrier communication systems." U.S. Pat. No. 6,130,918, 10 Oct. 2000.

[26] A. Shastri and B. Kroeger, "Method and apparatus for reducing peak to average power ratio in digital broadcasting systems." U.S. Pat. No. 6,128,350, 3 Oct. 2000.

[27] R. Bauml, R. Fisher, J. Huber, and S. Muller, "Method and device for reducing the crest factor in digital transmission procedures." U.S. Pat. No. 6,125,103, 26 Sep. 2000.

[28] K. Laird and J. Smith, "Method and apparatus for reducing peak-to-average power ratio of a composite carrier signal." U.S. Pat. No. 5,991,262, 23 Nov. 1999.

[29] M. Birchler, S. Jasper, and A. Tziortzis, "Low splatter peak-to-average signal reduction with interpolation." U.S. Pat. No. 5,638,403, 10 Jun. 1997.

[30] Federal Communications Commission, *FCC Regulations*. CFR Title 47, §§21.908.

[31] J. Kaiser, "Nonrecursive digital filter design using $I_0$-Sinh window function," in *Proceedings IEEE Symposium on Circuits and Systems*, pp. 20-23, Apr. 1974.

[32] W. H. Press, S. A. Teukolsky, W. T. Vetterling, and B. P. Flannery, *Numerical Recipes in C*. Cambridge University Press, 1992.

[33] ETSI, *Digital Video Broadcasting* (DVB); *Framing structure, channel coding and modulation for digital terrestrial television*, August 1997. ETS 300 744.

What is claimed is:

1. A method of reducing the peak-to-average power ratio (PAPR) of a modulated baseband signal, wherein the baseband signal is constituted by a waveform function modulated by information-carrying symbols transmitted in parallel, the method comprising the non-iterative steps of:

detecting peaks in the modulated baseband signal that exceed a threshold (C), and generating a pulse sequence signal (p[m]) therefrom;

applying a pulse sequence shaping to filter the pulse sequence signal for generating a peak-cancellation signal (c[m]); wherein the pulse sequence shaping is designed such that its pass-band is limited to a frequency-domain gap between the edge of an information-carrying frequency bandwidth of the modulated baseband signal and an edge of a frequency band for the baseband signal defined by a spectral mask specifying a maximum tolerable out-of-band emission; and subtracting the peak-cancellation signal (c[m]) from the modulated baseband signal to produce a reduced PAPR modulated baseband signal (ŝ'[m]).

2. The method of claim 1, further comprising oversampling the modulated baseband signal prior to the peak detecting step.

3. The method of claim 2, further comprising subtracting the peak-cancellation signal from the modulated baseband signal to produce a reduced-PAPR modulated baseband signal (ŝ'[m]).

4. A transmitter comprising:

a baseband signal generator operable to generate a digital baseband signal (ŝ[n]) from an input data stream;

a digital-to-analogue converter operable to convert the digital baseband signal into an analogue baseband signal (s[t]) prior to output by a transmitter stage [TX];

an oversampling filter arranged between the baseband signal generator and digital-to-analogue converter operable to oversample the digital baseband signal to generate an oversampled digital baseband signal (ŝ[m]);

a signal divider operable to split the oversampled digital baseband signal into first and second parts;

a peak detector arranged to receive the first part of the oversampled digital baseband signal as input and operable to output a pulse sequence signal (p[m]) containing a pulse for each peak in the oversampled digital baseband signal that exceeds a threshold level (C);

a pulse shaping filter operable to receive the pulse sequence signal and convert it into a filtered clipping signal (c[m]) having a pass-band limited to a frequency-domain gap between an edge of an information-carrying frequency bandwidth of the modulated baseband signal and an edge of a frequency band for the baseband signal defined by a spectral mask specifying a maximum tolerable out-of-band emission; and a signal combiner operable to subtract the filtered clipping signal from the second part of the oversampled digital baseband signal to produce a digital baseband signal (ŝ'[m]) with reduced PAPR for input to the digital-to-analogue converter.

5. The transmitter of claim 4, wherein the peak detector is further operable to output the pulse sequence signal comprising pulses having a magnitude corresponding to an amount by which the each peak exceeds the threshold level (C).

6. The transmitter of claim 4, wherein the pulse shaping filter comprises an FIR filter.

7. The transmitter of claim 5, wherein the pulse shaping filter comprises an FIR filter.

* * * * *